United States Patent [19]

Hwang et al.

[11] Patent Number: 4,863,183
[45] Date of Patent: Sep. 5, 1989

[54] FRONT-CARGO TRICYCLE

[76] Inventors: In Mo Hwang; Yong Koo Hwang, both of 301 N. School St., Mt. Prospect, Ill. 60056

[21] Appl. No.: 238,264

[22] Filed: Aug. 26, 1988

[51] Int. Cl.$^4$ .............................................. B62K 5/08
[52] U.S. Cl. ................................. 280/267; 180/210; 280/282
[58] Field of Search ................ 280/267, 269, 282, 91; 180/210

[56] References Cited

U.S. PATENT DOCUMENTS

| | | | |
|---|---|---|---|
| 580,587 | 4/1897 | Warman | 280/267 |
| 2,055,747 | 9/1936 | Laube et al. | 280/269 X |
| 3,561,778 | 2/1971 | LaBrie | 280/269 |
| 3,921,464 | 11/1975 | Greseth | 280/234 |
| 3,921,467 | 11/1975 | Matsuura | 280/269 |
| 4,088,199 | 5/1978 | Trautwein | 280/269 |
| 4,132,435 | 1/1979 | Wilson | 280/267 |
| 4,277,078 | 7/1981 | Root | 280/269 |
| 4,634,137 | 1/1987 | Cocksedge | 280/269 |
| 4,740,004 | 4/1988 | McMullen | 280/269 |

*Primary Examiner*—Charles A. Marmor
*Assistant Examiner*—Michael Mar
*Attorney, Agent, or Firm*—Birch, Stewart, Kolasch & Birch

[57] ABSTRACT

A tricycle which includes a pivotal handlebar about a handlebar sprocket, a drive chain rotating through sprockets disposed along a T-shaped configuration, a pair of front steering wheels, a single driven rear wheel, and a cargo basket attached to a beam member over the pair of front steering wheels, whereby, upon the upward and downward movement of the handlebar, the pair of steering wheels smoothly turn in the left or the right direction in a narrow space without shaking the cargo basket attached to the tricycle.

19 Claims, 3 Drawing Sheets

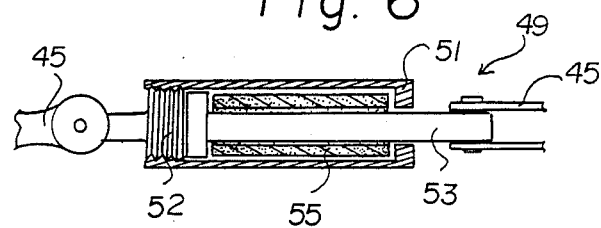
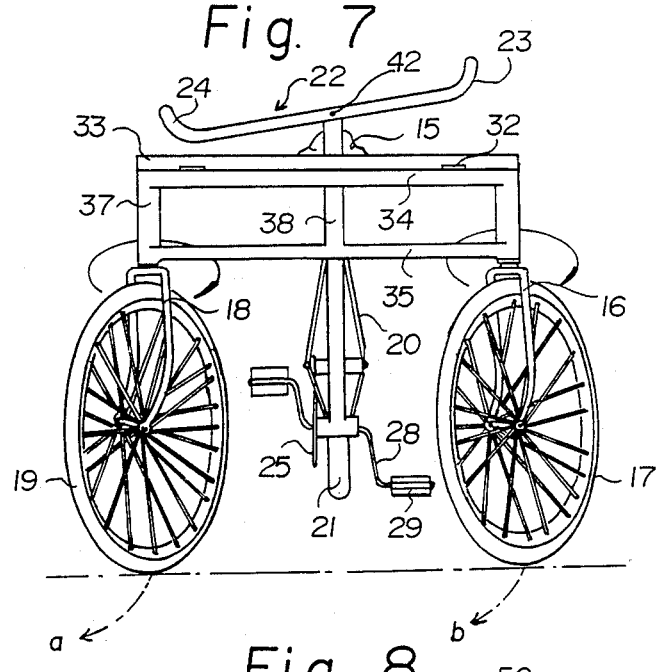
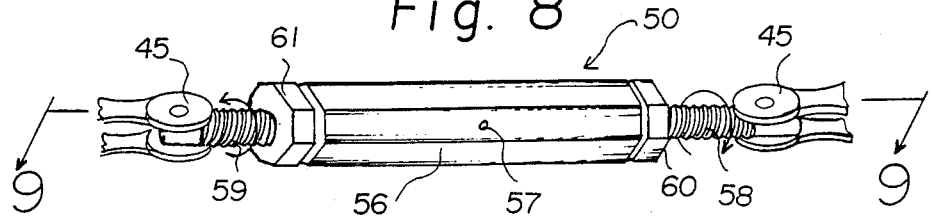
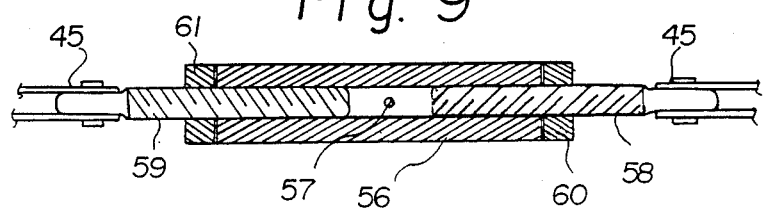

FRONT-CARGO TRICYCLE

BACKGROUND OF THE INVENTION

1. Field of the Invention

The present invention relates to a front-cargo tricycle and more particularly, a tricycle having a pair of steering front wheels and a single driven rear wheel which safely carries a relatively heavy load in a cargo basket attached to an upper beam over the pair of front steering wheels, and which is provided with a pivotal handlebar for upward and downward swinging movement about a handlebar sprocket shaft to easily turn the pair of front steering wheels in the two different directions.

2. Description of the Prior Art

Many types of tricycles with or without a basket are known in the art. Such tricycles are shown for example in U.S. Patents 580,587 to Warman, 3,561,778 to LaBrie, 3,921,467 to Matsuura, 4,088,199 to Trantwein, 4,132,435 to Wilson, 4,634,137 to Cocksedge, and 4,740,004 to McMullen. However, since such tricycles are turned by rotating the handlebar, and this requires both a wide operating space for turning the pair of front steering wheels and a strong force for turning the pair of front wheels. U.S. Patents, 2,251,639 to Schwinn, 2,256,629 to Schwinn, and 3,921,464 to Greseth show a bicycle carrier and a handlebar driven bicycle. However, such bicycles do not disclose a mechanism which translates vertical movement into horizontal movement.

SUMMARY OF THE INVENTION

Accordingly, it is an object of the present invention to provide an improved tricycle having a pair of front steering wheels, a single driven rear wheel and a load carrying structure disposed over the pair of front steering wheels.

Another object of the present invention is to provide a tricycle having a pivotal handlebar for upward and downward swinging movement about a handlebar sprocket shaft to easily turn a pair of front steering wheels since the movement of the handlebar translates the vertical movement to horizontal movement.

A further object of the present invention is to provide a tricycle which includes a cargo basket attached to a beam member and a pair of front forks rotatably disposed within hollow vertical side beams so that the cargo basket does not shake while the tricycle is turned. That is, the load in the cargo basket does not scatter or a baby in the cargo basket remains safely therein. Also, the pair of front forks does not require a large space for turning.

Still another object of the present invention is to provide a tricycle with a drive connecting member such as a chain, a wire rope, or a belt which is correspondingly rotated through a plurality of rotators such as chain-sprockets, rollers, or pulleys disposed along a T-shaped route. The drive connecting member is provided with joints for preventing the drive connecting member from twisting and an adjustable member for adjusting the length of the chain.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly, the present invention relates to a tricycle which includes a pivotal handlebar about a handlebar sprocket, a drive connecting member correspondingly rotating through sprockets, rollers, or pulleys disposed along a T-shaped route, a pair of front steering wheels, a single driven rear wheel, and a cargo basket attached to a beam member over the pair of front steering wheels, whereby, upon the upward and downward movement of the handlebar, the pair of steering wheels smoothly turn to left or right direction in a narrow space without any shake of the cargo basket.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a sectional view of FIG. 5 taken along line;

FIG. 7 is a front elevational view of the front-cargo tricycle of the present invention shown in banking position while executing a turn;

FIG. 8 is a perspective view of an adjustable member of the present invention; and FIG. 9 is a sectional view of FIG. 8 taken along line 9—9.

DESCRIPTION OF THE PREFERRED EMBODIMENTS

Figure 1:
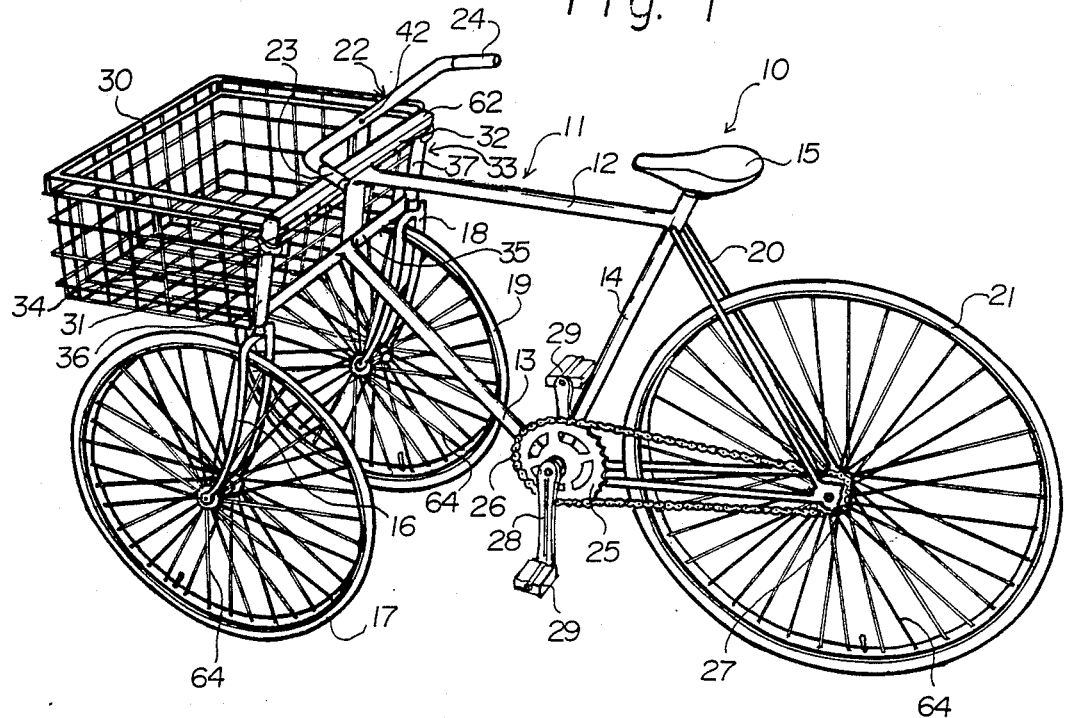
FIG. 1 is a perspective view of a front-cargo tricycle of the present invention.
Figure 2:
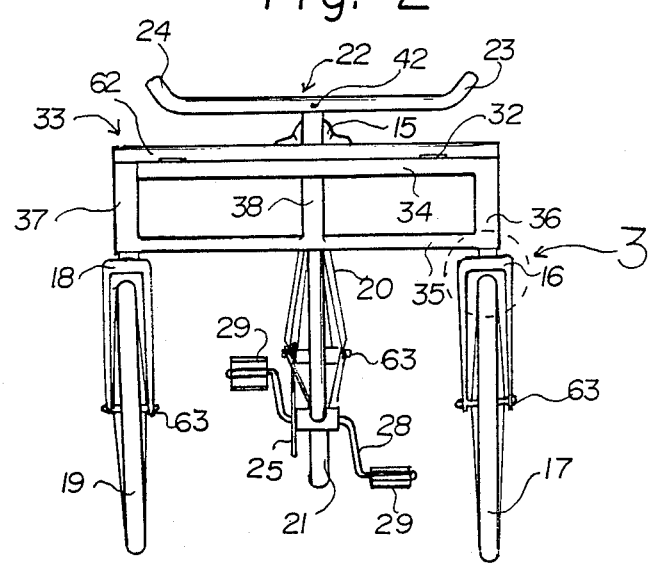
FIG. 2 is a front elevational view of a front-cargo tricycle of the present invention.

Referring now in detail to the drawings for the purpose of illustrating preferred embodiments of the present invention, the front-cargo tricycle 10 as shown in FIGS. 1 and 2 comprises a frame 11, a hollow rectangular beam 33 connected to the frame 11, left and right front forks 16 and 18 rotatably connected to the hollow rectangular beam 33, rear fork 20 connected to the frame 11, a pair of left and right front steering wheels 17 and 19 supported by the left and right front forks 16 and 18, and a single driven rear wheel 21 supported by the rear fork 20.

The frame 11 includes a top bar 12 and a bottom bar 13 joined to an upright post 14. A seat 15 is adjustably mounted on the top of the upright post 14. The wheels 17, 19 and 21 have an axle 63 and a plurality of spokes 64, respectively. The axle 63 of the rear wheel 21 is provided with a wheel sprocket 27 accommodating a wheel chain 26. The wheel chain 26 is located over a pedal sprocket 25 rotatably mounted on sleeve bearings disposed in a cylinder on the bottom of the upright post 14 (not shown). The pedal sprocket 25 is connected to a pair of foot pedals 29 through a pair of pedal supports 28 which are operable by foot power to rotate the pedal sprocket 25 and thereby rotate the single driven rear wheel 21 to propel the tricycle over the roadway, bike path, and the like. A suitable electric motor or internal combustion engine can also be used to drive the single driven rear wheel 21.

The hollow rectangular beam 33 is a lightweight solid material tubular frame and accordingly is made of metal or hard plastic. The hollow rectangular beam 33 includes an upper beam 34, a lower beam 35, left and right side beams 36 and 37, a center beam 38. The center beam 38 extends and is pivotably connected to a handlebar 22 by a handlebar sprocket shaft 42. The handlebar 22 contains a left handlebar end 23 and a right handlebar end 24 for being moved up or down in order to turn the pair of front steering wheels 17 and 18.

Figure 3:
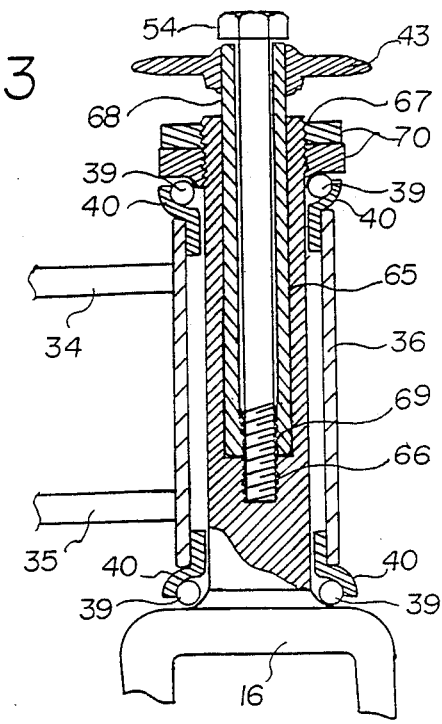
FIG. 3 is a section view of an assembly of a front fork and a sprocket rotatably disposed in a hollow vertical side beam taken along a dotted line 3 of FIG. 2.

The front forks 16 and 17 rotatably connected to the hollow left and right beams 36 and 37. For example, as shown in FIG. 3, the left front fork 16 is rotatably engaged in the hollow left side beam 36 through a left fork support 46 extended from the left front fork 16. The fork support 46 contains a large vertical hole 65 extending a small screwed hole 66 disposed therein. Also, the fork support 46 contains an outer screwed portion 67 disposed at the upper portion thereof. The left fork sprocket 43 is attached to the upper portion of a tubular connector 68 which includes a connector screw portion 69 disposed at the lower end thereof. After the tubular connector 68 is inserted into the large vertical hole 65 in the fork support 46, a screw bolt 54 is connected to the tubular connector 68 and the fork support 46 through the screws 66 and 69. A plurality of bearings 39 are disposed in upper and lower end annular bearing containers 40 for effectively and smoothly rotating the front fork 16. A plurality of nuts 70 are screwed with the outer screwed portion 67.

Figure 4:
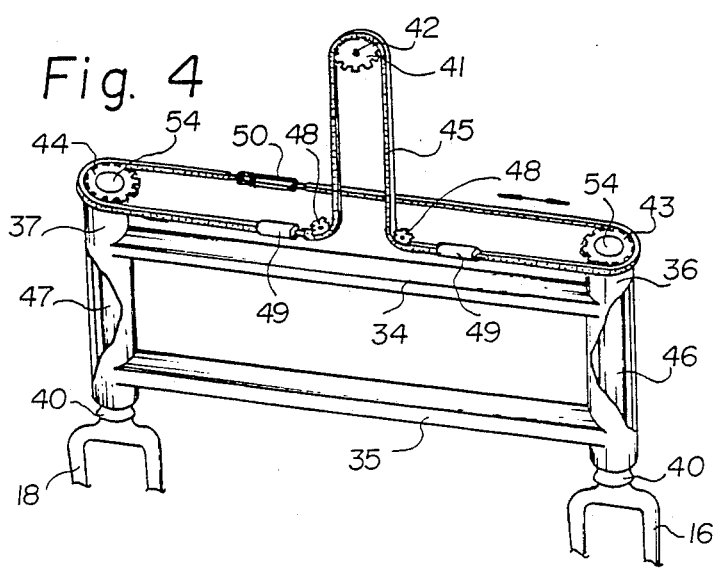
FIG. 4 is an enlarged, perspective view of the drive chain, sprockets, and front forks of the present invention showing in cut away portions thereof a chain moving route and rotatable front forks.

As shown in FIGS. 1 and 4, the movable handlebar 22 is pivotably connected to the handlebar sprocket shaft 42 of a handlebar sprocket 41. Also, the left and right fork supports 46 and 47 are provided with a left fork sprocket 43 and a right fork sprocket 44 disposed on the top thereof through the screw bolt 54, respectively. A drive chain 45 is engaged with the handlebar sprocket 41 and a pair of auxiliary sprockets 48 located at 90 degree bent portions of the drive chain, respectively, and the left and right fork sprockets 43 and 44 rotate the drive chain 45 in both directions by downward and upward movement of the left and right handlebar ends 23 and 24. For example, as shown in FIG. 7, when the tricycle rider pushes the right handle bar end 24 downward, the handlebar sprocket 42 rotates in the counterclockwise direction and simultaneously causes the right and left sprockets 44 and 43 to rotate in the clockwise direction indicated by arrows so that both the front forks 18 and 16 smoothly turn to the right. Therefore, the front wheels 19 and 17 simultaneously turn to the right in the direction indicated by arrows (a) and (b) (FIG. 7) and the tricycle 10 turns to the right.

Thus, the vertical movement of the handlebar 22 translates to horizontal movement of the front wheels 17 and 19 because of the T-shaped sprocket route in the steering mechanism according to the present invention. The drive chain 45 is provided with at least one pair of joints 49 for preventing the chain 45 from twisting while the chain is moving. Also, the chain 45 is provided with at least one adjustable member 50 for controlling a tension of the chain 45. The chain 45 is engaged in a chain cover 62 (FIG. 1).

Figure 5:
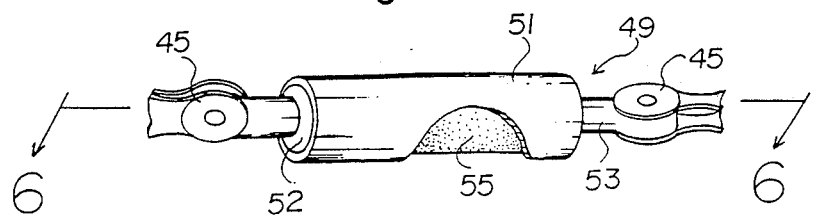
FIG. 5 is a perspective view of a joint of the present invention showing a cut away portion a compressed rubber.

As shown in FIGS. 5 and 6, the joint 49 includes a hollow cylindrical container 51 connected to one end of the drive chain 45 through a cap 52, a T-shaped piston 53 connected to the other end of the drive chain 45, and a tubular compressed rubber 55 which is rotatably engaged with the T-shaped piston (53), disposed in the hollow cylindrical container 51 for preventing the drive chain 45 from twisting while the drive chain 45 is moving, maintaining a tension of the drive chain 45, and absorbing any impacts to the drive chain 45.

As shown in FIGS. 8 and 9, the adjustable member 50 includes a right-handed bolt 58 and a left-handed bolt 59, which are connected together by a main nut 56, and a pair of lock nuts 60 and 61. The bolts 58 and 59 are connected to both ends of the drive chain 45. A handle such as a solid rod or a nail is inserted into a hole 57 disposed at the center of the main nut 56 for easily turning the main nut 56. Since the bolts 58 and 59 have opposite acting screw threads, the length of the chain 45 can be adjusted by rotating the main nut 56. After adjusting the chain 45, the lock nuts 60 and 61 are tightened for preventing the main nut 56 from loosing during the operation of the tricycle.

The cargo basket 30 is used for carrying various loads such as groceries, a baby, or the like is mounted to the upper beam 34 and the upper portion of the left and right side beams 36 and 37 by an engagement 31 such as a loop or a hook through apertures 32 disposed in the bottom surface of the chain cover 62. Since the cargo basket 30 is mounted to only the rectangular beam 33, although the front wheels 17 and 19 rotate rapidly, the cargo basket 30 does not shake or move unsteadily. Furthermore, since the cargo basket 30 is attached to the solid beam frame 33 supported by the pair of front wheels 17 and 18, the cargo basket 30 can carry a heavy load. Also, since the cargo basket 30 does not turn, the turning operation by the rider is very smooth and comfortable.

As an additional embodiment of a handlebar driven tricycle 10 in accordance with the present invention, the drive chain 45 can be replaced by a drive belt or a drive wire rope and all the sprockets 42, 43, 44, 48 can be replaced by rollers or pulleys, respectively.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A tricycle having a pair of front steering wheels, a single driven rear wheel, and a frame which comprises:
   a hollow rectangular beam fixedly connected to said frame, said hollow rectangular beam including an upper beam, a lower beam, left and right side beams, and a center beam,
   a drive handlebar having two ends, said drive handlebar being pivotably connected to the top of said center beam by a longitudinally extending shaft of a handlebar sprocket member and having a substantial horizontal axis of rotation,
   a drive chain engaged with said handlebar sprocket member,
   left and right fork sprocket members engaged with said drive chain to form a T-shaped configuration with said handlebar sprocket member and with a pair of auxiliary sprockets, said left and right fork sprocket members being disposed on the top of left and right fork supports extending from left and right forks of said pair of front steering wheels, said left and right fork supports being rotatably engaged in said hollow left and right side beams, at least one pair of joints disposed between both ends of said drive chain for preventing the drive chain from twisting, and at least one adjustable member disposed between both ends of said drive chain for controlling the tension of said drive chain, whereby upon pushing either of the ends of the handlebar upward or downward, the pair of front steering wheels easily and smoothly turn within a narrow space.

2. The tricycle of claim 1, wherein the drive chain is inserted in a T-shaped drive chain cover, the horizontal bottom of said T-shaped drive chain cover being attached to the top surface of said hollow upper beam.

3. The tricycle of claim 2, wherein a plurality of apertures are disposed between said bottom of the T-shaped drive chain cover and said top surface of the upper beam, respectively, for passing an engaging member.

4. The tricycle of claim 3, wherein the engaging member is a hook-type structure.

5. The tricycle of claim 1, wherein the pair of auxiliary sprockets are located in substantially the same plane as said left and right sprocket members and below the handlebar sprocket member for directing said drive chain in said T-shaped configuration.

6. The tricycle of claim 1, wherein the joint includes a hollow cylindrical container connected to one end of the drive chain, a piston connected to the other end of the drive chain, and compressed rubber disposed in said hollow cylindrical container for maintaining tension in the drive chain and absorbing impact to the drive chain.

7. The tricycle of claim 1, wherein the adjustable member includes a pair of opposite acting screw bolts, each of said screw bolts being connected to one end of the drive chain, a main screw nut having a hole in the middle for inserting a handle, and a pair of lock nuts located at the ends of said main screw nut.

8. The tricycle of claim 1, wherein a cargo basket is mounted to said upper beam and to the upper portion of both of said side beams.

9. A tricycle having a pair of front steering wheels, a single driven rear wheel, and a frame which comprises:

a hollow rectangular beam fixedly connected to said frame, said hollow rectangular beam including an upper beam, a lower beam, left and right side beams, and a center beam, a drive handlebar having two ends, said drive handlebar being pivotably connected to the top of said center beam by a longitudinally extending shaft of a handlebar sprocket member and having a substantial horizontal axis of rotation, a drive connecting member engaged with said handlebar sprocket, said drive connecting member comprising a continuous flexible member which partially encircles and drivingly engages said sprocket member, left and right fork sprocket members being adapted to engage with said drive connecting member to form a T-shaped configuration with said handlebar sprocket member and with a pair of auxiliary sprockets, said left and right fork sprocket members being disposed on the top of left and right fork supports extending from left and right forks of said pair of front steering wheels, said left and right fork supports being rotatably engaged in said hollow left and right side beams, at least one pair of joints disposed between both ends of said drive connecting member for preventing the same from twisting, and at least one adjustable member disposed between both ends of said drive connecting member for controlling the tension of said drive connecting member, whereby upon pushing either of the ends of the handlebar upward or downward, the pair of front steering wheels easily and smoothly turn within a narrow space.

10. The tricycle of claim 9, wherein the drive connecting member is a belt and the left and the right sprocket members and the pair of auxiliary sprockets are rollers.

11. The tricycle of claim 10, wherein a plurality of apertures are disposed between said bottom of the T-shaped drive connecting member cover and said top surface of the upper beam, respectively, for passing an engaging member.

12. The tricycle of claim 9, wherein the drive connecting member is a wire rope and the left and the right sprocket members and the pair of auxiliary rotators are pulleys.

13. The tricycle of claim 12, wherein the engaging member is a hook-type structure.

14. The tricycle of claim 9, wherein the belt is inserted in a T-shaped drive connecting member cover, the horizontal bottom of said T-shaped drive connecting member cover being attached to the top surface of said hollow upper beam.

15. The tricycle of claim 9, wherein the pair of auxiliary sprockets are located in substantially the same plane as said left and right sprocket members and below the handlebar sprocket member for directing said drive chain in said T-shaped configuration.

16. The tricycle of claim 9, wherein the joint includes a hollow cylindrical container connected to one end of the drive connecting member, a piston connected to the other end of the drive connecting member, and compressed rubber disposed in said hollow cylindrical container for maintaining tension in the drive connecting member and absorbing impact to the drive connecting member.

17. The tricycle of claim 9, wherein the adjustable member includes a pair of opposite acting screw threads engagingly connected at their one end to a screw nut disposed therebetween, and at their other end to opposite ends of said drive connecting member, whereby upon the rotation of the screw nut in either direction, the drive connecting member can be correspondingly tightened or loosened.

18. The tricycle of claim 17, wherein lock nuts are located on the screw threads at opposite sides of the screw nut for locking the screw nut in position.

19. The tricycle of claim 9, wherein a cargo basket is mounted to said upper beam and to the upper portion of both of said side beams.

* * * * *